Jan. 7, 1930.  J. B. HOLDEN  1,742,914
SHELL HANDLE
Filed Aug. 4, 1927
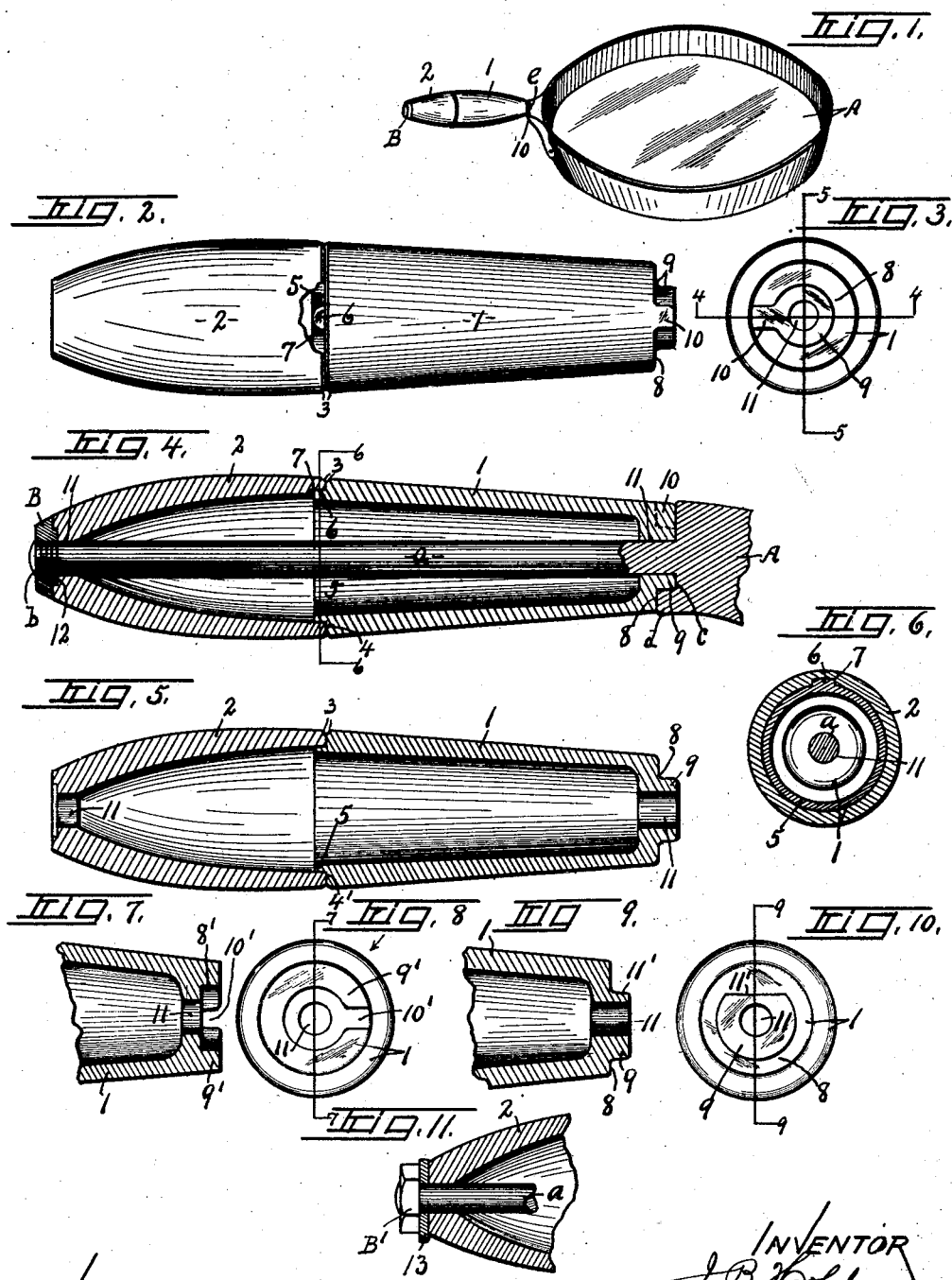

Patented Jan. 7, 1930

1,742,914

UNITED STATES PATENT OFFICE

JOSEPH B. HOLDEN, OF CANASTOTA, NEW YORK, ASSIGNOR TO DIEMOULDING PRODUCTION COMPANY INC., OF CANASTOTA, NEW YORK, A CORPORATION OF NEW YORK

SHELL HANDLE

Application filed August 4, 1927. Serial No. 210,566.

This invention relates to a shell handle for cooking utensils such as baking dishes, pans, kettles and the like, but obviously may be used for a variety of other purposes.

The main object is to mold a hollow sectional handle of this type from a minimum amount of bakelite or other plastic heat-resisting material by casing it into longitudinally tapered sections which may be easily and quickly withdrawn from the mold and when assembled with their larger ends together to secure a maximum strength and heat resistance with a minimum weight.

Another object is to die cast the hollow sections of the handle to exact form so that they may be assembled co-axially end to end and firmly clamped to each other and to the tang of the utensil against relative angular or axial movement with a single operation.

Other objects and uses relating to specific parts of the device will be brought out in the following description.

In the drawings:—

Figure 1 is a perspective view of a pan with one of my improved handles thereon.

Figure 2 is an enlarged side elevation, partly broken away, of the detached handle ready for application to the stem of the object to which it is to be applied.

Figure 3 is an end view of the handle shown in Figure 2.

Figures 4 and 5 are longitudinal sectional views at right angles to each other taken on lines 4—4 and 5—5, Figure 3, the handle being shown mounted upon the tang of the culinary utensil in Figure 4.

Figure 6 is a transverse sectional view taken in the plane of line 6—6, Figure 4.

Figure 7 is a longitudinal sectional view of the inner end of a slightly modified form of handle taken in the plane of line 7—7, Figure 8.

Figure 8 is an end view of the handle shown in Figure 7.

Figure 9 is a longitudinal sectional view of the inner end of a further modified form of handle taken in the plane of line 9—9, Figure 10.

Figure 10 is an end view of the handle shown in Figure 9.

Figure 11 is a longitudinal sectional view of the outer end of another handle and adjacent end of the tang of the utensil extended beyond the handle for receiving a nut and washer.

As illustrated, the handle comprises opposed axially elongated hollow sections —1— and —2— of bakelite or other suitable heat-resisting material molded to the required form preferably by die casting to impart the desired finish, strength and durability thereto with a minimum amount of material.

These sections are tapered longitudinally internally and externally in opposite directions to facilitate their removal from the molds and are co-axially end to end with their larger ends assembled telescopically engaged one with the other and of substantially the same external diameter so as to produce a smooth external finish with a close fitting joint and, if desired, may be slightly beveled at —3— to form an annular groove for ornamental purposes.

The outer end of the section —1— is provided with an annular groove —4— for receiving the adjacent end of the section —2— thereby forming an annular flange —5— which is formed with a peripheral lug —6— of relatively short circumferential length adapted to enter a corresponding recess —7— in the inner periphery of the adjacent end of the section —2— to lock the sections —1— and —2— against relative angular movement when assembled end to end.

The utensil as —A— to which the handle is to be applied is provided with a cylindrical tang —a— extending entirely through both of the sections —1— and —2— co-axial therewith and has its outer end threaded at —b— for receiving a nut —B— which is adapted to engage the outer end face of the section —2— as shown in Figure 4.

The portion of the utensil —A— adjacent the inner end of the tang —a— is provided with an annular groove —c— surrounded by an annular flange —d— except that a relatively small circumferential portion of the flange —d— is cut away to form a recess —e—.

The inner end of the handle section —1— is provided with an annular groove —8— and a reduced axially extending flange —9— except that a relatively small circumferential portion of the groove —8— is discontinued to form a lug —10— of substantially the same form as the recess —e— and adapted to enter said recess when the handle is assembled on the utensil to lock the handle section —1— and utensil against relative angular movement, it being understood that the assembly of the handle upon the utensil brings the flange —9-- into the groove —c— to firmly hold the handle section —1— and utensil against relative radial movement aided by the insertion of the tang —a— into the central opening as —11— in the inner end of the handle section —1—.

The outer end face of the handle section —2— is substantially flat except that it is provided with a reduced annular recess —12— for receiving a corresponding reduced inner end of the nut —B— which when screwed tightly upon the adjacent end of the stem —a— firmly clamps the adjacent ends of the handle sections —1— and —2— to each other and simultaneously clamps the inner end of the handle section —1— against the adjacent enlarged portion of the utensil —A—.

In Figures 7 and 8, the locking connections between the inner end of the handle section —1— and utensil —A— is reversed in that the inner end thereof is provided with an annular recess —8'— and an annular flange —9'— surrounding the recess except that a relatively small circumferential portion of the flange is cut away at —10'— for receiving a corresponding lug on the utensil —A—.

The construction of a handle section —1— shown in Figures 9 and 10 is somewhat similar to that shown in Figures 1 to 6 inclusive except that a portion of the periphery of the annular flange as —9— is cut away or flattened at —11'— to receive a correspondingly formed portion of the utensil —A— to hold the handle section and utensil against relative angular movement.

In Figure 11, the outer end face of the handle section —2— is substantially flat and adapted to be engaged by a washer —13— which is mounted on the adjacent portion of the tang —a— and is engaged by a nut —B'— on the threaded end of said tang.

As previously stated, the outer and inner peripheries of the handle sections —1— and —2— are tapered in opposite directions, the inner periphery of the handle section —1— being substantially straight longitudinally while the corresponding periphery of the handle section —2— is curved longitudinally while the corresponding periphery of the handle section —2— is curved longitudinally for convenience of handling, but the walls of both sections are relatively thin as compared with the diameters thereof for economy in stock and weight so that when assembled upon the tang —a— the major portions of the lengths thereof between the inner end of the section —1— and outer end of the section —2— will be in spaced relation to the stem for heat-insulating purposes.

That is, the inner end of the section —1— and outer end of the section —2— are the only parts of the handle which engage the tang —a— but when the sections are firmly clamped together end to end against each other and between the main body of the utensil —A— and nut —B— the adjacent telescoping ends of the sections firmly hold them against lateral movement relatively to each other and to the stem, and in view of the fact that the handle is made of heat-resisting material, it is evident that it affords a safe and convenient means for carrying and manipulating the utensil to which it is attached.

What I claim is:—

1. A shell handle for cooking utensils and the like comprising opposed hollow axially tapered sections of heat-resisting material having their larger ends arranged in co-axially abutting relation and provided with means for holding them against relative turning movement.

2. A shell handle for cooking utensils and the like comprising opposed co-axial hollow cast sections tapered longitudinally in opposite directions and having their larger ends telescopically assembled and provided with means for holding them against relative movement about their axis.

3. A handle for cooking utensils and the like comprising two longitudinally tapered hollow cast sections having their larger ends telescopically assembled and provided with interlocking members for holding the sections against relative angular movement, and means for holding the sections against axial separation.

In witness whereof I have hereunto set my hand this 25th day of July, 1927.

JOSEPH B. HOLDEN.